United States Patent Office 3,776,975
Patented Dec. 4, 1973

3,776,975
DISPROPORTIONATION PROCESS
Peter A. Verbrugge and Gerard J. Heiszwolf, Amsterdam, Netherlands, assignors to Shell Oil Company, Houston, Tex.
No Drawing. Filed Mar. 16, 1972, Ser. No. 235,322
Claims priority, application Netherlands, Mar. 19, 1971, 7104210
Int. Cl. C07c 3/62
U.S. Cl. 260—683 D
6 Claims

ABSTRACT OF THE DISCLOSURE

In the process for catalytic disproportionation of linear monoolefin reactant mixtures, each of which consists substantially of mixtures of olefins of internal double bond isomers, the disproportionation catalyst aging is substantially reduced by employing as one of the linear monoolefin reactant mixtures a mixture that contains at least 20% more β-olefins than would be present in the same mixture if isomerized to thermodynamic equilibrium. Also described is an improved process for the preparation of detergent range, $C_{11}$–$C_{15}$ linear internal monoolefins which utilizes as an essential processing step the above-described catalystic disproportionation reaction procedure.

BACKGROUND OF THE INVENTION

Field of the invention

The present invention relates to an improved catalytic disproportionation process for preparation of linear monoolefins, compounds of established utility for a variety of applications. One of the primary applications of linear monoolefins is their use as starting materials for biodegradable synthetic detergents. In this application the linear monoolefins of 11 to 20 carbon atoms are hydroformylated in the presence of a conventional hydroformylation catalyst to aldehydes with simultaneous and/or subsequent reduction of most of the aldehydes to $C_{12}$–$C_{21}$ alcohols. These alcohols are then converted to detergent base materials by esterification with sulfuric acid or by ethoxylation with ethylene oxide in the presence of a base catalyst, e.g., sodium hydroxide. In another application, the lower molecular weight alcohols are esterified with polyhydric acids, e.g., phthalic acid, to form plasticizers for polyvinyl chloride.

Furthermore, linear monoolefins with 11–20 carbon atoms are treated with carbon monoxide and water or with formic acid, in the presence of liquid, strongly acidic catalysts, such as, for example, sulfuric acid, phosphoric acid or mixtures of phosphoric acid, boron trifluoride and water, for the preparation of monocarboxylic acids, the carboxyl group of which is bound to a tertiary or quaternary carbon atom. These acids have a great variety of uses and are processed to chemical and light-resistant alkyd resins via their glycidyl esters and to latex paints based on copolymers of their vinyl esters and vinyl acetate.

DESCRIPTION OF THE PRIOR ART

Reactions of two olefinic molecules in the presence of metal-containing catalysts to produce other olefinic molecules, the sum of the carbon atoms present in the olefinic reactants being equal to the sum of the carbon atoms present in the olefinic products, are known in the art. These reactions are termed "disproportionation," "proportionation" or "metathesis." A typical olefin disproportionation process is illustrated by U.S. 3,261,879, issued July 19, 1966, to Banks, wherein two similar molecules of an olefin react in the presence of certain catalysts to produce one olefin of a higher carbon number and one olefin of a lower carbon number. For example, propylene disproportionates by the process of U.S. 3,261,879 to produce ethylene and butylene.

A variation of this disproportionation process, which might be termed "reverse disproportionation" or "proportionation" is illustrated by the Netherlands patent application 6514985 of British Petroleum Company Limited, published May 20, 1966, wherein, in one modification, molecules of two dissimilar olefins are reacted to form two molecules of a single olefin product of intermediate molecular weight, e.g., ethylene and 2-butene react to form propylene. A related "proportionation" process is illustrated by U.S. 3,634,538, issued Jan. 11, 1972, to Steffgen, wherein intermediate molecular weight olefin mixtures are produced by reacting mixtures of higher and lower molecular weight olefins in the presence of certain catalysts, recovering the intermediate product and recycling the higher and lower olefin products to the proportionation reaction.

A variety of catalysts has been employed for conducting disproportionation reactions. A description of suitable catalysts and reaction conditions is given in an extensive review article by G. C. Bailey in Catalysis Reviews 3(1), 37–60 (1969). Illustrative heterogeneous disproportionation catalysts include oxides of molybdenum and tungsten supported on inorganic carriers such as alumina or silica. Illustrative homogeneous catalysts include molybdenum or tungsten compounds in combination with organoaluminum compounds, as disclosed in U.S. 3,492,245 and U.S. 3,535,401 of Calderon et al.

Although a number of catalyst compositions are known to possess high levels of activity and selectivity in disproportionation reactions, the catalysts used are susceptible to aging. The aging process results in the loss of either catalytic activity or selectivity or both. This aging process, as a practical matter, adversely affects the catalyst life or catalyst make-up rate. Catalyst life in this connection is the time elapsed between two successive regenerations of the catalyst. It would be of advantage to conduct a disproportionation reaction, for example, between two reactant mixtures which are mixtures of internal monoolefins, in such a way that catalytic activity and selectivity are maintained while at the same time reducing the catalyst aging which occurs.

SUMMARY OF THE INVENTION

It has now been found that a substantial reduction in catalyst aging can be achieved in the catalytic disproportionation of linear monoolefins reactant mixtures, each of which consists substantially of mixtures of olefins of internal double bond isomers, by employing as one of the linear monoolefin reactant mixtures a mixture which contains at least 20% (mole) more β-olefins than would be present in the same mixture if isomerized to thermodynamic equilibrium.

This discovery that the β-olefin content at least in part determines the rate of catalyst aging in disproportionation reactions between linear monoolefin reactant mixtures consisting essentially of mixtures of internal double bond isomers, can be applied to special advantage in the preparation of detergent range, e.g., $C_{11}$–$C_{14}$, olefins utilizing starting materials such as mixtures of α-olefins which are available from, for example, the oligomerization of ethylene. Thus, a first mixture of linear α-olefins having a range of carbon numbers below the detergent range is converted to a mixture of internal linear monoolefins below the detergent range, having a β-olefin content at least 20% higher than would be present if the same α-olefin fraction had been isomerized to thermodynamic equilibrium, is contacted with a second mixture of linear α-olefins having a range of carbon numbers above the detergent range is isomerized to a mixture of linear internal monoolefins completely or substantially at thermodynamic equilibrium. The mixture of higher and lower linear monoolefins, prepared as above, is disproportionated with in the presence of a disproportionation catalyst thereby producing linear internal monoolefins within the detergent range which may be separated from the disproportionation reaction product using conventional techniques. This integrated process, which forms another aspect of this invention, provides a means of obtaining detergent range olefins via catalytic disproportionation of monoolefins while reducing the catalyst aging which normally occurs in disproportionation reactions to a minimum.

DESCRIPTION OF THE PREFERRED EMBODIMENTS

The internal linear monoolefin reactants

The process of the invention in its preferred embodiment comprises the contacting of two olefinic reactants of the following composition:

(a) A first olefinic reactant mixture consisting essentially of a mixture of linear internal monoolefins which may be of varying carbon number and of random double bond orientation but which contain at least 20% more $\beta$-olefins than would be present in the same mixture if isomerized to thermodynamic equilibrium (for convenience this reactant shall be hereafter referred to as the $\beta$-olefin rich reactant);

(b) A second olefinic reactant mixture consisting essentially of a mixture of linear internal monoolefins which may be of varying carbon number but which have a double bond orientation substantially equivalent to that existing in the same mixture isomerized to thermodynamic eqlilibrium;

in the presence of a disproportionation catalyst composition, thereby producing an olefinic reaction product made up of a mixture of linear internal monoolefins having a total number of carbon atoms equal to the sum of the two olefinic reactant mixtures and a number of ethylenic linkages equal to the sum of the ethylenic double bonds of the two olefinic reactant mixtures. A disproportionation reaction conducted according to the process of the invention as described above is accompanied by substantially reduced catalyst aging than would occur if both linear internal monoolefins reactant mixtures were mixtures of internal double bond isomers at thermodynamic equilibrium. The term "linear internal monoolefin" as utilized herein is not intended to preclude isomeric compositions containing minor amounts of $\alpha$-olefins, e.g., up to about 10% m. $\alpha$-olefin based on total olefin charge.

The term "thermodynamic equilibrium" as utilized herein is a known concept, e.g., see F. Asinger, "Monoolefins Chemistry and Technology," pp. 1020–1104 (English ed. 1968), and refers to the equilibrium which is set up between the individual theoretically possible bond-isomeric olefins of any given linear monoolefin if the double bond is allowed to migrate via conventional isomerization techniques from the terminal position in the molecule through the whole carbon skeleton to the other end of the molecule.

The thermodynamic equilibrium distribution of isomeric n-alkene (linear monoolefins) can be calculated, on the basis of the calculus of probabilities. The article by F. Asinger and B. Fell in Erdol and Kohle. Erdgas. Petrochemie, 19 177–181, (1966) mentions the following equilibrium compositions expressed in percent m.

|  | Alpha-alkene | Beta-alkene | Gamma-alkene | Delta-alkene |
|---|---|---|---|---|
| n-Butenes | 11 | 89 | | |
| n-Pentenes | 6 | 94 | | |
| n-Hexenes | 4 | 64 | 32 | |
| n-Heptenes | 3 | 48½ | 48½ | |
| n-Octenes | 2½ | 39 | 39 | 12½ |
| n-Nonenes | 2 | 32.7 | 32.7 | 39.7 |

The content of composite linear monoolefins of a mixture of linear monoolefins, in particular of isomeric linear monoolefins, can be determined, according to F. Asinger, by oxidative separation with silver oxide of the ozonides from the linear monoolefins, as described in Ber. dtsch. Ges., 75 (1942), 656–60, or by the ozonization of the linear monoolefins in an excess of methanol and subsequent reduction of the resulting hydroperoxides with dimethyl sulfide, with formation of carbonyl compounds (aldehydes).

The source of the linear monoolefin reactants for the process of the invention is wholly conventional, provided one reactant is a mixture of linear internal monoolefins having a $\beta$-olefin content at least 20% higher than that which would be present in the same mixture if isomerized to thermodynamic equilibrium and the other reactant is made up of a mixture of linear internal monoolefins equivalent to a mixture which is isomerized substantially or completely to thermodynamic equilibrium.

The specific range of carbon numbers in each linear monoolefin reactant mixture charged to the process of the invention will depend on the range of carbon numbers desired in the disproportionation product. Thus, in the preparation of detergent range linear monoolefins, e.g. $C_{11}$–$C_{14}$ olefins, which forms a preferred aspect of this invention the $\beta$-olefin rich reactant is made up of a mixture of internal monoolefins having a range of carbon numbers principally below the detergent range. This lower internal monoolefin reactant mixture may suitably contain minor proportions of internal monoolefins in the detergent range. The linear monoolefin reactant mixture made up of internal monoolefins isomerized substantially or completely to thermodynamic equilibrium is typically composed of a mixture of internal monoolefins having a range of carbon numbers principally above the detergent range. This higher internal monoolefin reactant mixture may suitably contain minor proportions of internal monoolefins in the detergent range but preferably contains only internal monoolefins above the detergent range e.g., down to $C_{16}$.

While it is critical to the invention that one of the linear internal monoolefin reactants contains at least 20% more $\beta$-olefin than would be present in the same reactant mixture if isomerized to thermodynamic equilibrium, there is no critical maximum limit to the amount of $\beta$-olefin that can be present in this $\beta$-olefin rich reactant. In general, the rate at which the disproportionation catalyst degrades is not further reduced when the $\beta$-olefin content of the reactant containing the greater amount of $\beta$-olefin becomes higher than about 80% m., but if desired the reactant having the higher $\beta$-olefin content can consist of percentages of $\beta$-olefin above 80% m., or even consist exclusively of $\beta$-olefins.

Because of their availability and ease of manufacture the linear internal monoolefin reactants of this invention are preferably derived from linear $\alpha$-olefins. The linear $\alpha$-olefins in turn may originate from any of a number of known sources, for example, thermal cracking of wax, dehydrogenation of linear alkanes, dehydrohalogenation of primary alkyl halides and the like. Preferred because of their case of manufacture, abundance in commerce and quality are $\alpha$-olefin feedstocks derived from oligomerization of ethylene. The oligomerization technique and catalysts which may be utilized to prepare the linear $\alpha$-olefin feedstock are conventional, being described for example, in U.S. 2,699,457, issued Jan. 11, 1955 to Ziegler et al., U.S. 3,310,600 issued Mar. 21, 1967, to Ziegler et al. and U.S. 3,478,124, issued Nov. 11, 1969, to Fernald et al., and U.S. 3,482,000, issued Dec. 2, 1969, to Fernald et al. All of the above-mentioned patents are directed to Ziegler-type ethylene oligomerization catalysts i.e., compounds of metals such as alkali metals (e.g., lithium sodium, potassium), alkaline earth metals such as beryllium and magnesium and Group III metals such as aluminum, gallium and indium. Preferred Ziegler-type oligomerization catalysts are aluminum trialkyls.

Another class of suitable ethylene oligomerization catalysts are nickel complexes of certain phosphorus-containing ligands, including those described in copending application U.S. Ser. No. 874,377, of Keim et al., common assignee, filed Nov. 5, 1969 (now abandoned), and U.S. Ser. No. 874,058 of Bauer et al., common assignee, filed Nov. 4, 1969 (now U.S. Pat. 3,647,914). Ser. No. 874,377 discloses the oligomerization of ethylene with nickel chelates of bidentate ligands having a tertiary organophosphorus moiety and a carboxymethyl or carboxyethyl group attached directly to the phosphorus atom of the organophosphorus moiety (e.g., a nickel chelate of diphenylcarboxymethylphosphine). Ser. No. 874,058 discloses the oligomerization of ethylene with nickel chelates of bidentate ligands having a tertiary organophosphorus moiety and a functional group selected from hydroxymethyl, mercaptomethyl, hydrocarboyl and hydrocarbyloxycarbonyl substituted on a carbon atom attached directly to the phosphorus atom of the organophosphorus moiety (e.g., a nickel chelate of diphenylhydroxymethylphosphine).

The product of the ethylene oligomerization process typically is a mixture of linear $\alpha$-olefins of even carbon number in the $C_4$–$C_{60}$ range. The distribution of the linear $\alpha$-olefin mixture can be controlled to a certain extent by the choice of oligomerization catalyst and reaction conditions. For most applications, the mixture of linear $\alpha$-olefins is suitably of from 4 to 40 with mixtures of 4 to 30 carbon atoms being preferred as starting materials for conversion into the linear internal monoolefins used according to the process of this invention. Oligomerization products having distribution patterns within the preferred range are readily obtainable to those skilled in the art of ethylene oligomerization.

Starting with mixtures of linear $\alpha$-olefins, the linear internal monoolefin reactants of this invention are readily prepared by shifting of the double bonds, i.e. double bond isomerization, to form the mixtures of internal monoolefin isomers desired. The isomerization can be conducted by any more or less conventional procedure, either in gas or liquid phase, with a wide variety of isomerization catalysts. For the $\beta$-olefinic rich reactant, utilized in the invention, the isomerization is carried out to a limited extent, i.e., only until the isomerization product has a $\beta$-olefin content while is at least 20% higher than the $\beta$-olefin content in the case of a thermodynamic equilibrium existing between isomeric olefins at the isomerization temperature. For the other reactant the isomerization is carried to completion, i.e., until the internal isomeric monoolefin composition approximates that present at thermodynamic equilibrium at the isomerization temperature. A large number of catalysts suitable for the isomerization of $\alpha$-olefins to either or both linear internal monoolefin reactant compositions are known in the literature; see, for example F. Asinger, "Monoolefins Chemistry and Technology," pp. 1020–1104 (English ed. 1968); "International Journal of Methods in Synthetic Organic Chemistry," Part I in No. 3, pp. 97–112, November 1969 and Part II on pp. 405–430, August 1970 and H. Dunning "Review of Olefin Isomerization," Industrial and Engineering Chemistry 45, 551 (1953). Examples of suitable catalysts are alumina, e.g., gamma-alumina; alkali metal in the presence of organic promoters such as metallic sodium in the presence of a halogen-substituted aromatic hydrocarbon; or a metal carbonyl, e.g., iron pentacarbonyl, a cobalt carbonyl or a nickel carbonyl. The isomerization to the $\beta$-olefinic rich reactant is preferably carried out in the presence of gamma-alumina, because in that case the conditions can easily be chosen such that the double bonds are shifted to a limited extent, without carbon skeleton isomerization, by employing a lower temperature and/or a higher gas space velocity than those which are required to reach thermodynamic equilibrium. The isomerization in this case is preferably carried out at a temperature of between 200 and 300° C. with the use of a gas hourly space velocity (GHSV) between 5 and 20 kg. of linear $\alpha$-olefins per. kg. of gamma-alumina per hour. In the isomerization to thermodynamic equilibrium, however, it is preferred to employ catalysts other than gamma-alumina, because of the then occurring skeleton isomerization of the comparatively long carbon chains at the more vigorous reaction conditions. The substantially complete isomerization is preferably carried out in the presence of catalysts such as a metallic alkali metal in the presence of organic promoters e.g., 0.05–0.5% w. of 2-chloro-1,4-dimethylbenzene and 0.1–1% w. of sodium, at 300° C. After three hours, use of this latter catalyst affords a clear mixture in which the isomeric internal monoolefins are in thermodynamic equilibrium. Also preferred is the use of a metal carbonyl isomerization catalyst, and particular reference is given to iron carbonyl since it very readily promotes shift of double bonds and is comparatively inexpensive.

Another attractive method of obtaining the $\beta$-olefinic rich reactant mixture from linear $\alpha$-olefin starting materials is through catalytic disproportionation of the $\alpha$-olefins with 2-butene. This disproportionation occurs in such a manner that a linear $\alpha$-olefin of $n$ carbon atoms is converted to a linear $\beta$-olefin of $n+1$ carbon atoms with propylene being formed in equimolar quantities as a by-product. When the $\alpha$-olefins are derived from the preferred source of $\alpha$-olefins i.e., oligomerization of ethylene, disproportionation with 2-butene affords a reaction product which is made up substantially of a mixture of linear $\beta$-olefins of odd carbon numbers. When this procedure is utilized in the preferred aspect of this invention, i.e. the process for production of detergent range internal monoolefins, the $\alpha$-olefins utilized are preferably in the $C_4$–$C_{10}$ range i.e., ethylene oligomers of 4, 6, 8 and 10 carbon atoms, since the $\beta$-olefin rich product which results will contain internal ($\beta$) olefins principally below the detergent range, i.e., $\beta$-olefins of 4, 7, 9 and 11 carbon atoms.

The disproportionation reaction can be conducted by any more or less conventional procedure. Suitable catalysts and reaction conditions are referenced and discussed in detail under the section entitled Disproportionation Reaction, below.

The disproportionation reaction

The disproportionation reaction conducted according to the process of the invention involves contacting mixtures of linear internal monoolefin reactant mixtures, one reactant mixture being the $\beta$-olefin rich reactant as defined above and the other reactant mixture being a mixture of internal isomeric olefins which are completely or substantially in thermodynamic equilibrium, in the presence of a disproportionation catalyst thereby producing a linear internal monoolefin reaction product of substantially different composition than either of the reactant compositions. Disproportionation reactions conducted according to this procedure lead to a substantial reduction in the catalyst aging as compared with that which occurs in disproportionation reactions wherein both reactants are mixtures of linear internal monoolefin having double bond isomer compositions the same as or approaching those present at thermodynamic equilibrium.

As indicated above, the specific range of molecular weights present in each of the reactant mixtures is not critical to the practice of the process of the invention and will, in practice, depend on the range of molecular weights desired in the product. For most applications it is convenient to utilize as one reactant, a mixture of linear internal monoolefins of carbon number below the range of carbon numbers desired in the final product, and as the other reactant a mixture of linear internal monoolefins of carbon number above the range desired. For example mixtures of linear internal monoolefins of 4 to 10 and 16 to 20 carbon atoms, below and above the detergent range, respectviely on disproportionation will yield linear internal monoolefins which are substantially in the detergent ($C_{11}$–$C_{15}$) range.

The disproportionation reaction can be conducted by any more or less conventional procedure. A description of suitable catalysts and reaction conditions is given in an extensive review article by G. C. Bailey in Catalysts Reviews 3(1), 37–60 (1969).

One modification of the disproportionation reaction utilizes a heterogeneous disproportionation catalyst. Catalysts to be recommended are compounds of a metal with atomic number 22 to 25, 40 to 46, 50 and 72 to 77 (hence, the metals titanium, vanadium, chromium manganese, zirconium, niobium, molybdenum, technetium, ruthenium, rhodium, palladium, tin, hafnium, tantalium, tungsten, rhenium, osmium and iridium). Of said metals, compounds of molybdenum, tungsten, and rhenium are most suitable. The above-mentioned disproportionation catalysts are typically applied, together with one or more compounds of one or more of the rare-earth metals, among which scandium and yttrium are also included, on a carrier containing at least 75% w. of aluminum oxide.

Most preferred are alumina-supported disproportionation catalysts, containing (1) one or more oxides of molybdenum, of cobalt and one or more alkali metal compounds, or (2) one or more oxides of tungsten and one or more alkali metal compounds, or (3) one or more compounds of rhenium as well as one or more compounds of molybdenum and/or tungsten. The last-mentioned catalysts preferably contain one or more compounds of molybdenum and 2–6% w. of a rhenium compound, calculated as $Re_2O_7$ on the carrier.

In a second modification, the disproportionation catalyst is dissolved in the mixture being disproportionated (a homogeneous catalyst). Examples of suitable homogeneous catalysts are those produced by combination of (a) one or more compounds of one or more transition metals of Groups IV–VII and noble metals of Group VIII and (b) one or more organometallic compounds of one or more metals of Groups II and/or III of the Periodic System of Elements, in the additional presence of molecular oxygen and/or a carboxylic acid as a catalyst promoter. Of the latter type of catalysts those containing tungsten hexachloride, ethylaluminum-dichloride and acetic acid have proved to be very suitable.

The disproportionation reaction may be affected batchwise or in continuous manner in the liquid phase, with fixed catalyst beds, suspended catalyst, fluidized catalyst beds, in a reactor provided with a stirring device or with application of another conventional contacting technique. Generally, this reaction is conducted at pressures greater than atomspheric, e.g., 5 to 50 atomspheres.

In most instances, the conversion of the monoolefin reactant mixtures to the appropriate isomer compositions and the disproportionation reaction between the reactant mixtures will be conducted in two steps, e.g., isomerization of linear $\alpha$-olefins to the appropriate isomer mixtures followed by disproportionation of the isomerized mixtures. However, in cases where the $\beta$-olefin rich reactant is derived from disproportionation of 2-butene with linear $\alpha$-olefins, the disproportionation between the $\beta$-olefin rich reactant and the reactant containing a mixture of linear internal monoolefins completely or substantially at thermodynamic equilibrium are suitably carried out in one step. In this procedure the linear $\alpha$-olefins having carbon numbers within or below the range desired for the $\beta$-olefin rich reactant, 2-butene and the reactant containing a mixture of linear internal monoolefins isomerized completely or substantially to thermodynamic equilibrium are simultaneously contacted with the disproportionation catalyst. After the composition of the reaction mixture has become completely or substantially constant, 2-butene is expelled from the reaction mixture, and the disproportionation is continued with the reaction mixture from which 2-butene has been removed. The 2-butene can be expelled by heating the mixture until it vaporizes. The 2-butene expelled can be used for any desired purpose, but is preferably recycled to the disproportionation reaction thereby reducing the quantity of 2-butene feedstock required from other sources while at the same time increasing the overall conversion of 2-butene to the product desired. This single step disproportionation procedure is preferred because it results in very high yields of the ultimate linear internal monoolefin product desired and because only one mass of disproportionation catalyst need to be used to effect the conversion.

As discussed previously, the concept and process of the invention can be utilized to reduce the catalyst aging which occurs in any disproportionation process employing as reactants mixtures of isomeric linear internal monoolefins, e.g., preparation of linear monoolefins of 16 to 20 carbon atoms used in preparation of basic salts which are valuable lubricating oil additives by disproportionation of a $\beta$-olefin rich mixture of isomeric linear internal monoolefins having carbon numbers below the selected range, e.g., $C_8$–$C_{15}$ with a mixture of isomeric linear internal monoolefins completely or substantially at thermodynamic equilibrium having carbon numbers above the selected range, e.g., $C_{21}$–$C_{30}$, in the presence of a catalyst. Many other applications will suggest themselves to those skilled in the art.

However, a particularly attractive modification of the process of the invention is in its application to the production of detergent range monoolefins. Here, through the combination of the afore-described processes for conversion of linear $\alpha$-olefins to the reactant compositions utilized in the process of the invention and the disproportionation according to the present invention, an integrated process for the production of detergent range olefins has been conceived. This process has the several advantages of the reduction of catalyst aging according to the concept of the invention, the utilization of available linear $\alpha$-olefin such as from the oligomerization of ethylene as starting materials and the production of both even and odd numbered linear monoolefins in the detergent range starting with linear $\alpha$-olefins which are substantially even numbered, e.g., ethylene oligomers. Also, this novel process results in increased conversions of the internal monoolefin reactants on disproportionation to detergent range linear internal monoolefins over those obtained if both internal monoolefin reactants are isomerized completely or substantially to thermodynamic equilibrium prior to disproportionation. This novel process which forms a preferred aspect of this invention comprises the following sequence of steps, reference being given previous discussions of each step:

(1) Converting in a first reaction zone, a mixture of linear $\alpha$-olefins, preferably derived from the oligomerization of ethylene (see above), to a mixture of linear internal monoolefins having a number of carbon atoms per molecule below the detergent range and a $\beta$-olefin content which is at least 20% higher than the $\beta$-olefin content in the case of isomeric linear monoolefins being in thermodynamic equilibrium at the isomerization temperature, (2) Isomerizing in a second reaction zone a mixture of linear $\alpha$-olefins (see above) having a carbon number above the detergent range by shifting of double bonds until the isomeric linear monoolefins are completely or substantially in thermodynamic equilibrium at the isomerization temperature, (3) Disproportionating in a third reaction zone the product of the first reaction zone with the product of the second reaction zone in the presence of a disproportionation catalyst, and (4) Separating from the disproportionation product in a first separation zone, the mixture of linear internal monoolefins having a number of carbon atoms per molecule within the detergent range.

The conversion in the first reaction zone can be carried out in any way desired but is preferably carried out by catalytic isomerization of a mixture of α-olefins as described above or by disproportionation of a mixture of α-olefins with 2-butene as described above. In cases where the conversion in the first reaction zone is conducted by disproportionating 2-butene with α-olefins, it is a preferred embodiment of this invention that this reaction can be combined with the disproportionation in the third reaction zone such that α-olefins having carbon numbers below the detergent range, 2-butene and the reaction product of the second reaction zone are simultaneously contacted by a single mass of disproportionation catalyst as described above.

The first separation zone may comprise a suitable fractionation unit or similar conventional separation apparatus. The disproportionation product from the third reaction zone may contain, in addition to the desired detergent range olefins, internal olefin reaction products which are above and below the detergent range. The products are suitably separated in the first separation zone by separating the reaction product into a lower internal monoolefin fraction below the detergent range, e.g., up to $C_{10}$, an intermediate internal monoolefin fraction within the detergent range, e.g., $C_{11}$–$C_{15}$, and a higher internal monoolefin fraction above the detergent range, e.g., $C_{16}$ and higher. In a preferred modification of the instant process the lower and higher internal monoolefin fractions are suitably recycled to the third reaction zone where they will react together or with other internal being added to the reaction zone to form internal monoolefins which are at least in part within the detergent range.

The invention is further illustrated with the aid of the following illustrative embodiments, dealing with the preparation of linear internal monoolefins (n-alkenes) in the detergent range, e.g. $C_{11}$–$C_{14}$ using oligomers of ethylene with 6, 8 and 10 and with 20–30 carbon atoms as starting materials. These illustrative embodiments demonstrate both the concept of the invention with respect to catalyst aging as well as the novel integrated process of the invention for preparation of detergent range linear internal monoolefins. With respect to the thermodynamic equilibrium values expressed for the isomeric mixtures of linear internal monoolefins below it should be noted that the thermodynamic equilibrium depends to some extent on the temperature and of course has to be determined for each temperature at which the isomerization is carried out. For simplicity in the examples the thermodynamic equilibrium between n-hexenes, n-octenes and n-decenes at 190° C. has been used.

ILLUSTRATIVE EMBODIMENT I (A) Not according to the invention (a) Preparation of a thermodynamic equilibrium mixture of n-hexenes, n-octenes and n-decenes in thermodynamic equilibrium.—A hydrogen-containing gaseous mixture of n-1-hexene, n-1-octene and n-1-decene (molar ratio 1:3/4:9/16) was passed through a catalyst bed at atmospheric pressure (alkenes/hydrogen molar ratio 6/1) and a gas hourly space velocity of 4.2 kg. of alkenes per kg. of catalyst per hour, which catalyst bed comprised gamma-alumina with a particle size of between 0.25 and 0.6 mm., a specific surface area of 350 m.²/g. and a pore volume of 0.47 ml./g. The temperature of the bed was kept at 330° C. The hydrocarbons in the gaseous effluent carried off from the bed were condensed and the composition of the condensate thus obtained was determined according to the method of F. Asinger (via aldehydes). This composition, together with thermodynamic equilibrium composition, are presented in Table A, expressed in percent m.

TABLE A

| | Alpha-alkene | | Beta-alkene | | Gamma-alkene | | Delta-alkene | | Eta-alkene | |
|---|---|---|---|---|---|---|---|---|---|---|
| | Found | Equilibrium | Found | Equilibrium | Found | Equilibrium | Found | Equilibrium | Found | Equilibrium |
| n-Hexenes | 6 | 4 | 62 | 64 | 32 | 32 | | | | |
| n-Octenes | 5 | 2.5 | 36 | 39 | 38 | 39 | 21 | 19.5 | | |
| n-Decenes | 4 | 2 | 28 | 28 | 30 | 28 | 26 | 28 | 12 | 14 |

From the figures presented in Table A it appears that the thermodynamic equilibrium was substantially reached, so that the isomerized mixture contained less β-alkenes than is necessary for the β-olefin rich reactant of the invention. The condensate was obtained in a yield of 100%, calculated on the α-alkenes used as starting material.

(b) Preparation of a thermodynamic equilibrium mixture of n-alkenes having 20, 22, 24, 26, 28 and 30 carbon atoms.—A mixture of 3.5% of n-1-$C_{20}H_{40}$, 36.2% of n-1-$C_{22}H_{44}$, 33.7% of n-1-$C_{24}H_{48}$, 19.5% of n-1-$C_{26}H_{52}$, 6.6% of n-1-$C_{28}H_{56}$ and 0.5% of 1-$C_{30}H_{60}$ (percent m.) was stirred intensively in a nitrogen environment at 300° C., with 0.5% w. metallic sodium and 0.2% w. of 2-chloro-1, 4-dimethyl-benzene. At regular intervals the composition of the reaction mixture thus formed was determined according to F. Asinger (via aldehydes), which showed that the composition remained constant from three hours after the isomerization had started. In the determination the following n-alkylidene fragments were found in the molar percentages indicated: $C_1$ 0.5, $C_2$ 5.7, $C_3$ 2.9, $C_4$ 5.6, $C_5$ 3.5, $C_6$ 3.7, $C_7$ 3.3, $C_8$ 2.4, $C_9$ 3.1, $C_{10}$ 2.6, $C_{11}$ 3.8, $C_{12}$ 5.5, $C_{13}$ 4.8, $C_{14}$ 6.1, $C_{15}$ 5.0, $C_{16}$ 6.2, $C_{17}$ 4.6, $C_{18}$ 5.9, $C_{19}$ 4.2, $C_{20}$ 7.3, $C_{21}$ 2.1, $C_{22}$ 6.5, $C_{23}$ 0.9, $C_{24}$ 2.8, $C_{25}$ 0.2, $C_{26}$ 0.9.

After filtration of the reaction mixture the yield of isomerized n-alkenes, calculated on the starting mixture, proved to be 100%.

(c) Disproportionation. — The isomerized mixtures prepared in the ways described under (a) and (b) were dried by means of molecular sieves, nitrogen subsequently being passed through to remove traces of oxygen, if present. Subsequently 2.0 parts by weight (p.b.w.) of the mixture prepared according to (a) together with 110 p.b.w. of the mixture prepared according to (b) were passed through a disproportionation catalyst bed, at a space velocity of 2.5 kg. of the combined mixtures per kg. of catalyst per hour, and at atmospheric pressure. The catalyst comprised molybdenum oxide, cobalt oxide and potassium oxide, supported on gamma-alumina; the composition (expressed in percent w., calculated on total catalyst) was 80.4% $AlO_3$, 12.6% $MoO_3$, 4.2% CoO and 0.3% $K_2O$, while the carrier also contained 0.15% $Na_2O$, 1.6% $SiO_2$, 0.11% $Fe_2O_3$, 0.59% sulfur (calculated as $SO_3$), and 0.05% CaO (calculated as CaO). The catalyst employed had a particle size of between 0.25 and 0.6 mm. The temperature of the catalyst bed was kept at 120° C. The reaction product effluent was condensed and then distilled to determine the yield of n-$C_{11}$–$C_{14}$ alkenes. The yields obtained at three points of time after the start of the disproportionation, calculated on the sum of the two mixtures fed into the catalyst bed, are presented in Table B.

TABLE B

| Period of time after start, h.: | Yield of n-$C_{14}$–$C_{14}$ Alkenes, percent w. |
|---|---|
| 0.5 | 20.5 |
| 44 | 17.5 |
| 56 | 16.3 |

Fifty-six hours after the start of the disproportionation it was possible to increase this yield further to 18% w. by raising the temperature of the catalyst bed to 140° C. However, after 15 hours at 140° C. the yield had decreased to 17% and only one hour later had dropped to an insignificant level.

(B) According to the invention (a) Preparation of a mixture of isomerized n-hexenes, n-octenes and n-decenes.—A hydrogen-containing gaseous mixture of n-1-hexene, n-1-octene and n-1-decene (molar ratio 1:3/4:9/16) was passed through a catalyst bed at atmospheric pressure alkenes:hydrogen (molar ratio 5:1) and a gas velocity of 6 kg. of alkenes per kg. of catalyst per hour, which catalyst bed comprised gamma-alumina with a particle size of between 0.25 and 0.6 mm. a specific surface area of 350 m.²/g. and a pore volume of 0.47 ml./g. The temperature of the bed was kept at 270° C. The hydrocarbons carried off from the bed were condensed, and the composition of the condensate thus obtained (fraction 1) was determined in the way mentioned hereinbefore according to F. Asinger (via aldehydes). These compositions, together with the thermodynamic equilibrium compositions, are presented in Table C, expressed in percent m.

placed by n-$C_6$–$C_{10}$ alkenes prepared according to Illustrative Embodiment I(B)(a). The yield of n-$C_{11}$–$C_{14}$ alkenes after a reaction period of 3 minutes was now 24.1% w.

ILLUSTRATIVE EMBODIMENT III

A mixture of 14.7 mmole (millimole) of n-2-hexene, 11.02 mmole of n-2-octene and 8.26 mmole of n-2-decene was put into a round-bottom flask. Since this mixture also contained 2-hexene, 2-octene and 2-decene in a molar ratio of 1:3/4:9/16, whereas a thermodynamic equilibrium the mixture, like in Illustrative Embodiment I(B)(a), would contain 47.1% of beta-alkenes, this starting mixture contained 112% of beta-alkenes more than would be present at thermodynamic equilibrium. In addition 5.62 mmole (0.5 p.b.w., calculated on the beta-alkenes) of the thermodynamic equilibrium mixture of n-alkenes having 20–30 C atoms prepared according to Illustrative Embodiment I(A)(b), and 17.6 mmole of n-heptane was put into the flask. The flask was subsequently supplied with 2.8 g. of a disproportionation catalyst comprising gamma-alumina (particle size between 0.049 and 0.074 mm.), which supported 5% w. of rhenium heptoxide and 10% w. of molybdenum trioxide (calculated on alumina). The suspension thus formed was kept

TABLE C

|  | Alpha-alkenes | | Beta-alkenes | | Gamma-alkenes | | Delta-alkenes | | Eta-alkenes | |
| --- | --- | --- | --- | --- | --- | --- | --- | --- | --- | --- |
|  | Found | Equilibrium | Found | Equilibrium | Found | Equilibrium | Found | Equilibrium | Found | Equilibrium |
| n-Hexenes | 24 | 4 | 65 | 64 | 11 | 32 |  |  |  |  |
| n-Octenes | 8 | 2.5 | 61 | 39 | 24 | 39 | 7 | 19.5 |  |  |
| n-Decenes | 4 | 2 | 52 | 28 | 30 | 28 | 12 | 28 | 2 | 14 |

From Table C it can be calculated that the weighted arithmetic mean (i.e. the molar ratio of the three alpha-alkenes in the starting mixture being taken into account) of n-beta-alkenes according to thermodynamic equilibrium distribution is 47.1%, and the isomerized fraction contains 60.5% n-beta-alkene, or 28.4% more than that according to thermodynamic equilibrium distribution.

(b) Disproportionation.—Subsequently, the disproportionation described under (A)(c) was repeated, the only difference being that the n-$C_6$–$C_{10}$ alkenes prepared according to (A)(a) were replaced by the β-olefin rich n-$C_6$–$C_{10}$ alkenes prepared according to (B)(a). Here it was possible to continue the disproportionation for at least 250 hours, the yield of n-$C_{11}$–$C_{14}$ alkenes being constantly 24%.

ILLUSTRATIVE EMBODIMENT II (A) Not according to the invention

Two parts by weight of the thermodynamic equilibrium mixture of n-hexenes, n-octenes and n-decenes prepared according to Illustrative Embodiment I(A)(a), and one part by weight of the thermodynamic equilibrium mixture of n-alkenes having 20–30 carbon atoms and monochlorobenzene prepared according to Illustrative Embodiment I(A)(b) (chlorobenzene/alkenes volume ratio 4/2) were put into a round-bottomed flask. The two mixtures were disproportionated for three minutes in a homogeneous liquid environment at atmospheric pressure and 20° C. under nitrogen by addition of WCl$_6$ (alkenes/WCl$_6$ molar ratio 5000/1), acetic acid and subsequently ethylaluminum dichloride (WCl$_6$/acetic acid/$C_2H_5AlCl_2$ molar ratio 1/0.5/4). The disproportionation was carried out with intensive stirring. The mixture obtained after disproportionation was distilled and gave a yield of 19.9% w. of n-$C_{11}$–$C_{14}$ alkenes.

(B) According to the invention

Subsequently the disproportionation described under (A) of this Illustrative Embodiment was repeated, the only difference being that the n-$C_6$–$C_{10}$ alkenes prepared according to Illustrative Embodiment I(A)(a) were refor 19 hours at 65° C. under a nitrogen atmosphere at atmospheric pressure with intensive stirring, after which the catalyst was filtered off and the filtrate distilled, which gave a n-$C_{11}$–$C_{14}$ alkene yield of 22.8% w., calculated on the sum of the two starting materials.

ILLUSTRATIVE EMBODIMENT IV (A) Not according to the invention

A mixture of n-1-hexene, n-1-octene and n-1-decene (molar ratio 1:3/4:9/16) and 0.5 p.b.w. (calculated on the last-mentioned mixture) of the isomerized n-alkenes having 20–30 carbon atoms prepared according to Illustrative Embodiment I(A)(b) (all starting materials having previously been purified by percolation in the presence of hydrogen over gamma-alumina supporting 5% w. of metallic sodium; no double bonds being shifted) was passed through a catalyst bed at a space velocity of 3 kg. of total mixture per kg. of catalyst per hour, at 21 atm. abs., which catalyst bed comprised a carrier of gamma-alumina supporting 10% w. of tungsten trioxide (calculated as WO$_3$ on gamma-alumina) and 0.65% w. of potassium oxide (calculated as K on gamma-alumina). The temperature of the bed was kept at 225° C. Analysis of the reaction mixture leaving the catalyst bed showed that the n-$C_{11}$–$C_{14}$ alkene content of the mixture decreased rather quickly and after 50 (100) run hours amount to 13(10)% w., calculated on the total amount of alkenes present in the mixture.

(B) According to the invention

A mixture of n-1-hexene, n-1-octene and n-1-decene (molar ratio 1:3/4:9/16) was converted to a mixture of n-$C_6$, n-$C_8$ and n-$C_{10}$ alkenes, at 25 to 50° C. in the presence of hydrogen and metallic potassium of gamma-alumina as carrier, which mixture contained 60% of beta-alkenes, 30% of gamma-alkenes and 10% of delta-alkenes, that is 27.4% of beta-alkenes more than the 47.1% of beta-alkenes according to the thermodynamic equilibrium distribution (see Illustrative Embodiment I(B)(a)). Subsequently the disproportionation as described in this Illustrative Embodiment under (A) was repeated with this isomerized mixture instead of with the n-alpha-alkenes having 6, 8 and 10 carbon atoms. The reaction mixture carried off from the catalyst bed was distilled at four points of time after the start of the disproportionation, the yield of n-$C_{11}$-$C_{14}$ alkenes being determined. The disproportionation was subsequently repeated at a space velocity of 1.5 kg./kg./h. The n-$C_{11}$-$C_{14}$ alkene yields are presented in Table D.

TABLE D

| Number of run hours after start of experiment | n-$C_{11}$-$C_{14}$ alkenes yield at WHSV (kg./kg./h.) | |
|---|---|---|
| | 1.5 | 3.0 |
| 10 | 22 | 19 |
| 50 | 22 | 18.5 |
| 100 | 22 | 18.5 |
| 200 | 18.5 | 18 |

ILLUSTRATIVE EMBODIMENT V

A mixture of 14.7 mmole of 1-hexene, 11.02 mmole of 1-octene, 8.26 mmole of 1-decene, 5.62 mmole of the fully isomerized $C_{20}$-$C_{30}$ alkenes of the same composition as mentioned in Illustrative Embodiment I under (A)(b) and 17.6 ml. of n-heptane ($C_6$-$C_{10}$/$C_{20}$-$C_{30}$ weight ratio 2/1) was used as starting material. To this mixture 2.7 g. of the disproportionation catalyst described in Illustrative Embodiment III was added. The mixture was then stirred together with the catalyst at 20° C. while such an amount of 2-butene was introduced at atmospheric pressure that all the 2-butene introduced was just absorbed. After 95 minutes of the disproportionation, when the composition of the reaction mixture became constant, propene and 2-butene were expelled by heating of the reaction mixture for four hours at 65° C. After the catalyst had been filtered off, the n-$C_{11}$-$C_{14}$ fraction was obtained by distillation in a yield of 26.4% w., calculated on the alkenes added for the disproportionation.

We claim as our invention:

1. In the disproportionation of two linear monoolefin hydrocarbon reactants each of which consists essentially of mixtures of internal double bond isomers, in the presence of an olefin disproportionation catalyst, thereby producing an olefinic reaction product made up of a mixture of linear internal monoolefins having a total number of carbon atoms equal to the sum of the carbon atoms of two olefinic reactant mixtures and a number of ethylenic linkages equal to the sum of the ethylenic double bonds of the two olefinic reactant mixtures the improvement which comprises employing as one of the linear monoolefin reactant mixtures a mixture which contains at least 20% more β-olefins than would be present in the same mixture if isomerized to thermodynamic equilibrium and as the other linear monoolefin reactant mixture, a mixture which consists essentially of a mixture of linear internal monoolefins of varying carbon number having a double bond orientation substantially equivalent to that existing in the same mixture isomerized to thermodynamic equilibrium.

2. The process of claim 1 wherein the linear monoolefin reactants are both derived from isomerization of α-olefins.

3. The process of claim 1 wherein the linear internal monoolefin reactant, consisting essentially of a mixture of linear internal monoolefins of at least 20% more β-olefins than would be present in the same mixture if isomerized to thermodynamic equilibrium, is derived from catalytic disproportionation of α-olefins with 2-butene; and the linear internal monoolefin reactant, consisting essentially of a mixture of linear internal monoolefins which have a double bond orientation substantially equivalent to that existing in the same mixture isomerized to thermodynamic equilibrium, is derived from isomerization of α-olefins.

4. A process for the preparation of linear internal monoolefins within the $C_{11}$ to $C_{14}$ range of carbon numbers which comprises (1) converting in a first reaction zone, a mixture of linear α-olefins, thereby producing a mixture of linear internal monoolefins having a number of carbon atoms per molecule below $C_{11}$ and a β-olefin content which is at least 20% higher than the β-olefin content than would be present in the same number of isomeric linear monoolefins at thermodynamic equilibrium at the isomerization temperature, said conversion being carried out by double bond isomerization of the α-olefins or by disproportionation of the α-olefins with 2-butene, (2) isomerizing in a second reaction zone a mixture of linear α-olefins having a carbon number above $C_{14}$ by shifting of double bonds until the isomeric linear monoolefins are substantially completely at thermodynamic equilibrium at the isomerization temperature, (3) disproportionating in a third reaction zone the product of the first reaction zone with the product of the second reaction zone in the presence of a disproportionation catalyst, (4) separating from the disproportionation product in a first separation zone, the mixture of linear internal monoolefins having a number of carbon atoms per molecule within the $C_{11}$ to $C_{14}$ range.

5. The process of claim 4 wherein the reaction in the first reaction zone is double bond isomerization of α-olefins.

6. The process of claim 4 wherein the reaction in the first reaction zone is disproportionation of a mixture of α-olefins below $C_{11}$ with 2-butene in the presence of a disproportionation catalyst.

References Cited
UNITED STATES PATENTS

| 3,600,456 | 8/1971 | Bradshaw | 260—683 |
|---|---|---|---|
| 3,686,136 | 8/1972 | Doyle | 260—683 |
| 3,491,163 | 1/1970 | Kenton et al. | 260—683 |
| 3,634,538 | 1/1972 | Steffgen | 260—683 |
| 3,647,906 | 3/1972 | Farley | 260—683 |
| 3,526,676 | 9/1970 | Turner et al. | 260—683 |
| 3,658,929 | 4/1972 | Banks | 260—683 |
| 3,562,178 | 2/1971 | Hughes et al. | 260—683 |
| 3,261,879 | 7/1966 | Banks | 260—683 |

DELBERT E. GANTZ, Primary Examiner

C. E. SPRESSER, Jr., Assistant Examiner